Patented Feb. 18, 1947

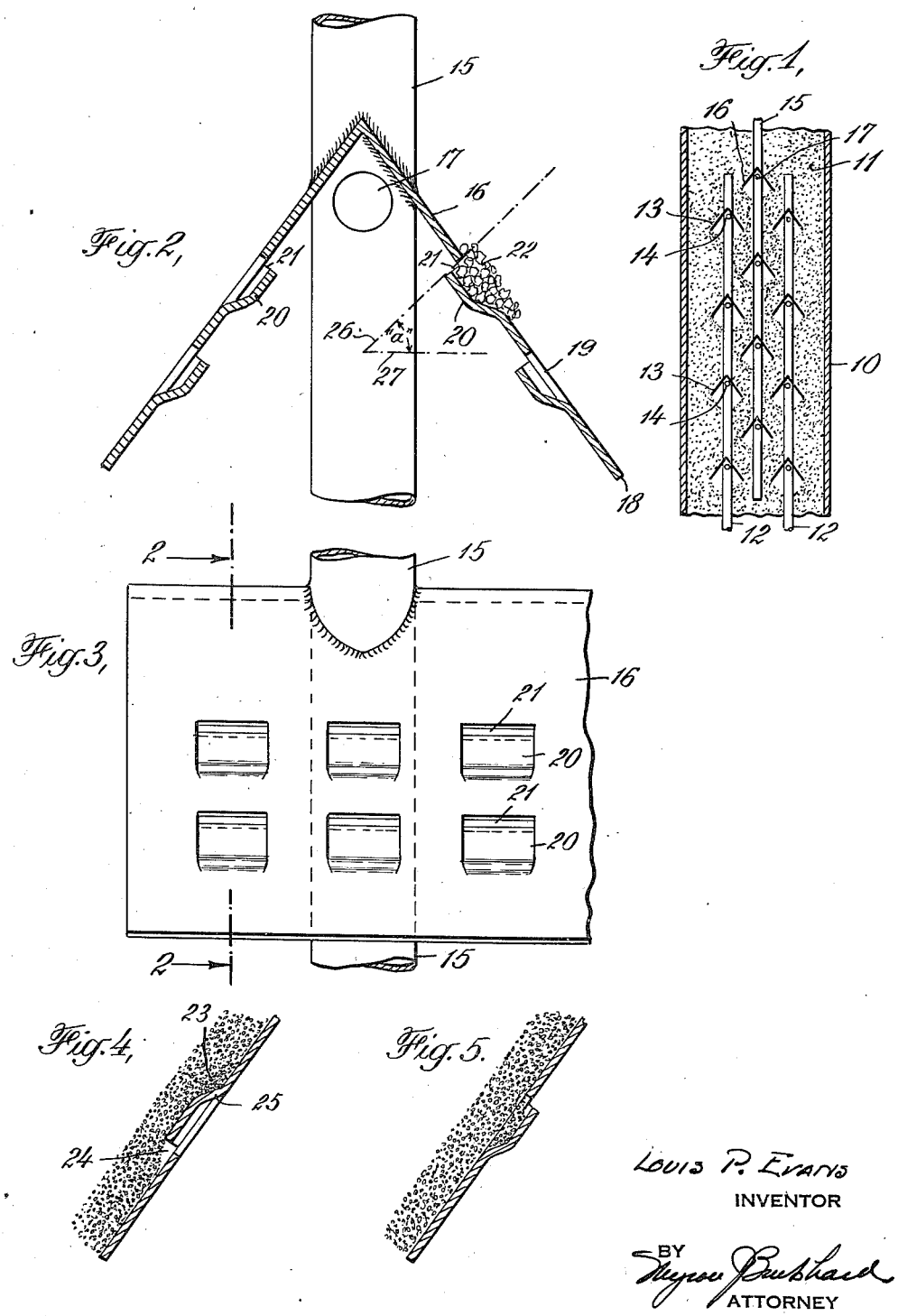

2,416,165

UNITED STATES PATENT OFFICE 2,416,165

APPARATUS FOR CONTACTING FLUIDS AND SOLIDS

Louis P. Evans, Woodbury, N. J., assignor to Socony-Vacuum Oil Company, Incorporated, a corporation of New York Application September 15, 1942, Serial No. 458,436

2 Claims. (Cl. 23—288)

This invention is directed to apparatus wherein a fluid, such as a gas or vapor, is contacted with a flowing particle form solid, for example, an apparatus such as that described in application Serial No. 447,432, filed June 17, 1942, Simpson et al., in which I am a joint inventor, which apparatus is designed for the conversion of hydrocarbons in the presence of a catalytic contact mass.

In the apparatus spoken of, a particle form solid adsorptive contact mass is flowed as a solid column downwardly through a confined space, through which there extend vertically two series of tubes. Vapors to be reacted are introduced into one series of such tubes, pass outwardly therefrom into the contact mass, and from the contact mass pass inwardly into tubes of the other series, to be withdrawn.

The principal object of this inventon is to provide an improved form of a certain detailed device for the handling of reaction fluids in such a contactor.

The invention as well as its surroundings, may be understood by reference to the attached drawing, wherein Figure 1 shows in highly diagrammatic form the type of reactor, Figures 2 and 3 show the device of the invention, and Figures 4 and 5 show, by comparison, one of the advantages of the construction here disclosed.

In Figure 1, there is shown a reactor encased by shell 10, which is filled with a solid descending column of particle form catalyst, 11. Into the column of catalyst there extends one series of tubes 12, closed at their upper ends, provided at intervals along their length with inverted distributing troughs 13, and with an orifice 14 under each trough 13. Another series of tubes 15 is provided, similarly equipped with collector troughs 16, and orifices 17. In operation reactant gases or vapors introduced through distributor tubes 12, flow therefrom through orifices 14 into the space under distributor troughs 13, thence out into the column of particle-form solid catalytic material, are next collected under troughs 16, pass through orifices 17 into tubes 15, and out of the system. The present invention is specifically concerned with troughs such as 13 and 16, and as shown in Figures 2 and 3, where there is shown a tube 15 with trough 16 and orifice 17, is directed to providing enhanced areas for passage of fluid between the space under said trough and the surrounding contact mass. The area for passage of fluid between the space under trough 16 and the surrounding contact mass should be appreciably greater than that afforded by the bottom edge 18 of the trough 16. I have found that this may best be met by slots 19, of a particular form. These slots are made by depressing inwardly a portion of the trough side wall, 20, to provide at the upper end of said depressed portion a slit 21.

The width of this slit may be variable, but is dependent upon the angle of inclination of the side of the trough and upon the angle of repose of the particle-form solid contact mass material. In Figure 2 there is shown a line, designated 26, which line is drawn through the two adjacent edges which define slit 21. This line 26 is shown as intersecting a horizontal line 27, to form an angle $a$. The angle $a$ so formed should be less than the angle of repose of the contact mass material. For most forms of contact mass material, the angle of repose ranges around 35° and for such material a value of 25–30° for angle $a$ would be satisfactory. This will, of course, give a possibility of using varying slit widths dependent upon the slope of the side wall of the trough, extending from a maximum width with a vertical side wall to decreasing values as the side wall is tipped increasingly from the vertical. Since the side wall of the trough will of necessity have a slope appreciably greater than the angle of repose of the material of the contact mass, this permits of slits of appreciable minimum widths, and with steeply sloping trough side walls, the slit width may be much greater than the particle diameter without danger of passage of particles therethrough.

The inbent feature is of paramount importance. Experiments observing the flow of solid particle-form catalyst over both inbent and outbent slotting have shown clearly the contrast developed in Figures 4 and 5. In Figure 5, there is shown an area 23, above the outbent slot 24 where a very serious collection of "dead" that is, non-flowing catalytic material collected, almost regardless of the exact form or positioning of the shoulder 25. When a simple slot was used, catalyst particles sticking in said slot gave rise to almost exactly the same phenomena. All told the sum of these dead spots throughout a moving bed reactor amounts to serious decrease in the active catalyst capacity thereof. On the contrary, the inbent, slit-at-the-top, construction of Figure 5 not only presents no shoulder restrictive of the particle flow area and no rough slit wherein particles might catch, but has been found by observation of flow to present no dead areas of non-moving catalyst particles.

The construction shown is applicable both to distributor troughs and collector troughs.

The percentage of openings through the side walls may be varied up to a large percentage of the side wall areas, but should vary between about 10% and about 50% of the side wall area of the trough and preferably should be around 30% of the side wall area.

I claim:

1. A device for the transfer of fluid reactants into and out of a moving solid column of particle form solid contact material comprising in combination a substantially upright conduit having a perforation therein, an inverted roughly V-shaped trough attached substantially perpendicularly to said conduit so that its apex is positioned just above the perforation in said conduit, and in the side walls of said trough a series of slotted openings, each formed by longitudinally slitting the wall of the trough and inbending the portion of the sidewall below said slit to form a slot between the edge of the undeformed sidewall and the edge of the inbent portion, the total open area of said slots comprising about 30% of the total sidewall area of said trough.

2. A device for the transfer of fluid reactants into and out of a moving solid column of particle form contact material which comprises in combination an elongated conduit positioned substantially vertically in said column, having apertures therein at spaced vertical intervals, a plurality of roughly V-shaped troughs invertedly attached substantially perpendicularly to said conduit at spaced intervals along its length so that the apex of each trough is just above one of said apertures in said conduit, and in the side walls of each trough a series of slotted openings, each formed by longitudinally slitting the wall of the trough and inbending the portion of the sidewall below said slit to form a slot between the edge of the undeformed sidewall and the edge of the inbent portion.

LOUIS P. EVANS.

REFERENCES CITED

The following references are of record in the file of this patent:

UNITED STATES PATENTS

| Number | Name | Date |
|--------|------|------|
| 488,770 | McKee | Dec. 27, 1892 |
| 691,209 | Tweedale et al. | Jan. 14, 1902 |
| 731,682 | Hillig | June 23, 1903 |